United States Patent
Seignobos

(10) Patent No.: US 10,202,521 B2
(45) Date of Patent: Feb. 12, 2019

(54) DISH SUPPORT RACK FOR DISHWASHER

(71) Applicant: RHODIA OPERATIONS, Paris (FR)

(72) Inventor: Elodie Seignobos, Saint Genis Laval (FR)

(73) Assignee: Rhodia Operations, Paris (FR)

(*) Notice: Subject to any disclaimer, the term of this patent is extended or adjusted under 35 U.S.C. 154(b) by 0 days.

(21) Appl. No.: 15/125,508

(22) PCT Filed: Mar. 11, 2015

(86) PCT No.: PCT/EP2015/055113
§ 371 (c)(1),
(2) Date: Sep. 12, 2016

(87) PCT Pub. No.: WO2015/136014
PCT Pub. Date: Sep. 17, 2015

(65) Prior Publication Data
US 2017/0073544 A1 Mar. 16, 2017

(30) Foreign Application Priority Data
Mar. 12, 2014 (EP) .................................... 14305358

(51) Int. Cl.
C08L 77/00 (2006.01)
A47L 15/50 (2006.01)
C09D 177/06 (2006.01)
C09D 5/03 (2006.01)
C08G 69/26 (2006.01)
C08G 69/36 (2006.01)
C09D 7/41 (2018.01)
C09D 7/61 (2018.01)
C09D 7/48 (2018.01)
C08K 3/22 (2006.01)

(52) U.S. Cl.
CPC ............ C09D 177/06 (2013.01); A47L 15/50 (2013.01); C08G 69/265 (2013.01); C08G 69/36 (2013.01); C09D 5/03 (2013.01); C09D 7/41 (2018.01); C09D 7/48 (2018.01); C09D 7/61 (2018.01); C08K 2003/2241 (2013.01)

(58) Field of Classification Search
None
See application file for complete search history.

(56) References Cited

U.S. PATENT DOCUMENTS

| 2011/0236698 A1 | 9/2011 | Filou et al. | |
| 2012/0301736 A1 | 11/2012 | Huraux et al. | |
| 2013/0171390 A1* | 7/2013 | Chou | C09D 177/02 428/35.8 |

FOREIGN PATENT DOCUMENTS

| EP | 2784122 A1 | | 10/2014 |
| FR | 2933706 A1 | | 1/2010 |
| WO | WO 97/21496 | * | 6/1997 |
| WO | 20100004227 A2 | | 1/2010 |
| WO | 20110092444 A1 | | 8/2011 |
| WO | 20120092104 A1 | | 7/2012 |

OTHER PUBLICATIONS

M. I. Kohan: "Polymer Data Handbook—Nylon 6, 10"; Oxford University Press, Inc.; 1999, pp. 210-217, XP002739232; 198 Madison Avenue, New York 10016, USA; Retrieved from the Internet: URL:http:/www.toarplast.co.il/linkspage/handbook.pdf [retrieved on May 6, 2015].
"International Standard ISO 307 Ed. 5"; May 15, 2007 (May 15, 2007); International Standard—ISO, Zuerich, CH, pp. I-V; XP003028445.

* cited by examiner

Primary Examiner — Ana L. Woodward
(74) Attorney, Agent, or Firm — Osha Liang LLP

(57) ABSTRACT

The invention pertains to a dish support rack having outstanding resistance to chemically harsh environments, and possessing improved mechanical properties, said dish support rack comprising a metal wire frame coated with a polyamide composition [composition (C)] comprising:
—more than 50% wt of a polyamide [polyamide (A), herein after], more than 50% moles of recurring units of said polyamide complying with formula: —HN—$(CH_2)_6$—NH—C(O)—$(CH_2)_8$—C(O)— [recurring units $(R_{6,10})$], and, optionally: —up to 10% wt of conventional filler(s) and/or additive(s), and to a method for its manufacture.

20 Claims, No Drawings

DISH SUPPORT RACK FOR DISHWASHER

CROSS-REFERENCE TO RELATED APPLICATION

This application is a U.S. national stage entry under 35 U.S.C. § 371 of International Application No. PCT/EP2015/055113, filed Mar. 11, 2015, which claims priority to European Application No. 14305358.5 filed on Mar. 12, 2014. The whole content of each of these applications is hereby incorporated herein by reference for all purposes.

TECHNICAL FIELD

The present invention pertains to the art of dishwashers and more particularly to a dishwasher dish support rack.

BACKGROUND ART

Most domestic dishwashers include two dish racks to support items to be washed such as dishware, glassware, kitchen utensils, pots, pans and the like.

Typically, the two dish racks include an upper rack positioned near a top portion of the dishwasher, and a lower dish rack arranged below the upper rack. The upper dish rack is used to support glassware, utensils and other small items, while the lower dish rack is used to support larger items, such as dinner plates and backing pans.

Dishwasher racks need protection from the constant spurts of hot water and harsh detergents that churn through every dishwashing cycle. Design of choice is thus customarily based on frames made of steel wire coated with a plastic material.

Dish support racks need exhibiting appropriate mechanical properties, so as to resist to wear and impact caused by the contact with dishware and not to be scraped off with a fingernail or an errant fork or knife. To this aim, thus, the selection of an appropriate coating plastic material has focused on polyamide materials. Generally color of the coating varies according to the design of the machine equipped with the rack and is achieved by adding commercial pigments to the coating. While the selection of the coating is not critical, it is nevertheless customary to employ at least one opacifying filler or pigment in the coating compound.

Thus, US 20010032825 (DEGUSSA-HUELS AG) 25, Oct. 2001 discloses a dish rack for a dishwasher, including a frame and a coating covering the frame and configured to distribute water over a surface of the coating in a thin film, wherein said coating may be plastic, substantially polyamide.

Similarly, DE 19917151 A (MIELE) 19, Oct. 2000 discloses a dish support rack for dishwasher formed from a wire basket coated with a polyamide material or with polyethylene. More specifically, this document discloses polyamide 11 and polyamide 12 as preferred materials over polyamide 6 and polyamide 6,6, and over polyethylene. Underlying rationale provided in this document is that performances of the plastic coating material are deeply influenced by the ratio between the number of methylene groups ($-CH_2-$) and the number of amido-group ($-CO-NH-$), the higher this ratio, the better being the oil resistance and the lower the water absorption, and the more limited being hydrolytic depolymerisation phenomena. Within this scenario, thus, PA11 and PA12 were found to be best performers for optimal coating of metal wires of dish support racks.

Nevertheless, the relatively large number of methylene groups in PA11 and PA12 make the threshold for plastic deformation relatively low: in other terms, even relatively low stress applied might cause plastic deformations which cannot be recovered. As a whole, thus, dish racks coated with PA11 or PA12 might be relatively sensible to deformation and giving whitening phenomena and possibly failures.

A continuous need in the art thus exists for polyamide-based compositions suitable for coating dish support racks in dishwashers, delivering outstanding resistance to chemically harsh environments, and possessing improved mechanical properties.

SUMMARY OF INVENTION

The Applicant has now found that it is possible to deliver such advantageous properties by providing a dish support rack comprising a metal wire frame coated with a polyamide composition [composition (C)] comprising:

more than 50% wt of a polyamide [polyamide (A), hereinafter], more than 50% moles of recurring units of said polyamide complying with formula: $-HN-(CH_2)_6-NH-C(O)-(CH_2)_8-C(O)-$ [recurring units $(R_{6,10})$], said polyamide (A) possessing a relative viscosity (RV) of at least 2, when measured in formic acid, according to ISO 307 standard, and, optionally:

up to 10% wt of conventional filler(s) and/or additive(s).

The Applicant has surprisingly found that despite a molar ratio amide groups over $-CH_2-$ group in recurring units of formula $-HN-(CH_2)_6-NH-C(O)-(CH_2)_8-C(O)-$ in polyamide (A) significantly inferior to PA11 and PA12, by appropriate selection of a RV range, when a composition comprising the same is used for coating a dish support rack, outstanding performances are obtained in particular with regards to stability at relatively high temperature and harsh environment (like those encountered during dishwashing cycles), with a better mechanical properties compromise, providing for increased stress at yield, thus indicating better resistance against plastic deformations.

Recurring units $(R_{6,10})$ of the polyamide (A) can be notably obtained via polycondensation reaction of hexamethylene diamine and sebacic acid or derivatives thereof.

Recurring units of the polyamide (A) can be all of $(R_{6,10})$ type, or can be of more than one type, that is to say that the polyamide (A) can be a homo-polyamide or a co-polyamide.

In case the polyamide (A) is a co-polyamide, said polyamide (A) generally comprises, in addition to recurring units $(R_{6,10})$, as above detailed, recurring units of with any of formula (I) or formula (II) different from recurring units $(R_{6,10})$ [recurring units $(R_{PA})$]:

$$-NH-R^1-CO- \qquad \text{formula (I):}$$

$$-NH-R^2-NH-CO-R^3-CO-, \qquad \text{formula (II):}$$

wherein:

$R^1$, equal to or different from each other at each occurrence, is a divalent hydrocarbon group having from 3 to 17 carbon atoms;

$R^2$, equal to or different from each other at each occurrence, is a divalent hydrocarbon group having from 2 to 18 carbon atoms; and $R^3$, equal to or different from each other at each occurrence, is a bond or a divalent hydrocarbon group having from 1 to 16 carbon atoms.

The polyamide of the inventive composition is preferably an aliphatic polyamide, that is to say that $R^1$, $R^2$ and $R^3$ are aliphatic group.

Recurring units ($R_{PA}$) different from recurring units ($R_{6,10}$) of the polyamide (A) can be notably obtained through polycondensation reaction of (1) one of β-lactam, 5-aminopentanoic acid, ε-caprolactam, 9-aminononanoic acid, 10-aminodecanoic acid, 11-aminoundecanoic acid, 12-aminododecanoic acid and/or (2) polycondensation reaction of one of more of oxalic acid (HOOC—COOH), malonic acid (HOOC—CH$_2$—COOH), succinic acid [HOOC—(CH$_2$)$_2$—COOH], glutaric acid [HOOC—(CH$_2$)$_3$—COOH], adipic acid [HOOC—(CH$_2$)$_4$—COOH], 2,4,4-trimethyl-adipic acid [HOOC—CH(CH$_3$)—CH$_2$—C(CH$_3$)$_2$—CH$_2$—COOH], pimelic acid [HOOC—(CH$_2$)$_5$—COOH], suberic acid [HOOC—(CH$_2$)$_6$—COOH], azelaic acid [HOOC—(CH$_2$)$_7$—COOH], sebacic acid [HOOC—(CH$_2$)$_8$—COOH], undecanedioic acid [HOOC—(CH$_2$)$_9$—COOH], dodecandioic acid [HOOC—(CH$_2$)$_{10}$—COOH], tetradecandioic acid [HOOC—(CH$_2$)$_{12}$—COOH], octadecandioic acid [HOOC—(CH$_2$)$_{16}$—COOH] with one of 1,2-diaminoethane, 1,2-diaminopropane, propylene-1,3-diamine, 1,3-diaminobutane, 1,4-diaminobutane, 1,5-diaminopentane, 1,4-diamino-1,1-dimethylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,2-diamino-1-butylethane, 1,6-diaminohexane, 1,7-diaminoheptane, 1,8-diamino-octane, 1,6-diamino-2,5-dimethylhexane, 1,6-diamino-2,4-dimethylhexane, 1,6-diamino-3,3-dimethylhexane, 1,6-diamino-2,2-dimethylhexane, 1,9-diaminononane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,2-dimethylheptane, 1,10-diaminodecane, 1.8-diamino-1,3-dimethyloctane, 1,8-diamino-1,4-dimethyloctane, 1.8-diamino-2,4-dimethyloctane, 1,8-diamino-3,4-dimethyloctane, 1.8-diamino-4,5-dimethyloctane, 1.8-diamino-2,2-dimethyloctane, 1.8-diamino-3,3-dimethyloctane, 1,8-diamino-4,4-dimethyloctane, 1,6-diamino-2,4-diethylhexane, 1,9-diamino-5-methylnonane, 1,11-diaminoundecane, and 1,12-diaminododecane.

Exemplary recurring units ($R_{PA}$) different from recurring units ($R_{6,10}$) of the polyamide (A) are notably:

(j) —NH—(CH$_2$)$_5$—CO—, i.e. recurring units which can be notably obtained via polycondensation reaction of ε-caprolactam;

(jj) —NH—(CH$_2$)$_8$—CO—, i.e. recurring units which can be notably obtained via polycondensation reaction of 9-aminononanoic acid;

(jjj) —NH—(CH$_2$)$_9$—CO—, i.e. recurring units which can be notably obtained via polycondensation reaction of 10-aminodecanoic acid;

(jv) —NH—(CH$_2$)$_{10}$—CO—, i.e. recurring units which can be notably obtained via polycondensation reaction of 11-aminoundecanoic acid;

(v) —NH—(CH$_2$)$_{11}$—CO—, i.e. recurring units which can be notably obtained via polycondensation reaction of laurolactam;

(vj) —NH—(CH$_2$)$_6$—NH—CO—(CH$_2$)$_4$—CO—, i.e. recurring units which can be notably obtained via polycondensation reaction of hexamethylene diamine and adipic acid;

(vjj) —NH—(CH$_2$)$_6$—NH—CO—(CH$_2$)$_{10}$—CO—, i.e. recurring units which can be notably obtained via polycondensation reaction of hexamethylene diamine and dodecandioic acid (vjjj) —NH—(CH$_2$)$_6$—NH—CO—(CH$_2$)$_{12}$—CO—, i.e. recurring units which can be notably obtained via polycondensation reaction of hexamethylene diamine and tetradecandioic acid;

(jx) —NH—(CH$_2$)$_{10}$—NH—CO—(CH$_2$)$_{10}$—CO—, i.e. recurring units which can be notably obtained via polycondensation reaction of decamethylene diamine and dodecandioic acid;

(x) —NH—(CH$_2$)$_6$—NH—CO—(CH$_2$)$_7$—CO—, i.e. recurring units which can be notably obtained via polycondensation reaction of hexamethylene diamine and azelaic acid (otherwise known as nonandioic acid);

(xj) —NH—(CH$_2$)$_{12}$—NH—CO—(CH$_2$)$_{10}$—CO—, i.e. recurring units which can be notably obtained via polycondensation reaction of dodecamethylene diamine and dodecandioic acid;

(xjj) —NH—(CH$_2$)$_{10}$—NH—CO—(CH$_2$)$_8$—CO—, i.e. recurring units which can be notably obtained via polycondensation reaction of decamethylene diamine and decandioic acid.

(xjjj) —NH—(CH$_2$)$_4$—NH—CO—(CH$_2$)$_4$—CO—, i.e. recurring units which can be notably obtained via polycondensation reaction of 1,4-butanediamine and adipic acid;

(xjv) —NH—(CH$_2$)$_4$—NH—CO—(CH$_2$)$_8$—CO—, i.e. recurring units which can be notably obtained via polycondensation reaction of 1,4-butanediamine and sebacic acid.

More than 50% moles, preferably more than 60% moles, even more preferably more than 70% moles of recurring units of the polyamide (A) are recurring units ($R_{6,10}$), as above detailed.

Preferably the polyamide (A) consists essentially of recurring units ($R_{6,10}$), as above detailed, that is to say polyamide (A) is a homo-polyamide PA6,10, being understood that end-chain, defects and other irregularities can be present in the polyamide (A) chain, without this affecting the properties thereof.

The polyamide (A) possesses a relative viscosity (RV) of at least 2, preferably at least 2.2, more preferably at least 2.5 and/or generally of at most 4.2, preferably at most 3.5, more preferably at most 3, when measured in formic acid, according to ISO 307 standard.

The choice of this specific molecular weight, corresponding to a RV within the claimed range, is such to ensure the outstanding performances of polyamide (A)-based composition in this peculiar field of use, i.e. in dish racks coating.

Polyamides (A) possessing a RV of comprised between 2.5 and 3, e.g. having a relative viscosity of 2.6 to 2.8, have been found particularly advantageous for the manufacture of dish racks of the invention.

A PA610 homopolymer particularly suitable is STABAMID® 28CE2, available from Solvay.

Composition (C) generally comprises polyamide (A), as above defined, in an amount of more than 50% wt, preferably at least 60% wt, more preferably at least 70% wt, even more preferably at least 80% wt, and in particularly preferred case at least 90% wt, with respect to the total weight of the composition (C).

It is nevertheless understood that according to certain embodiments, the composition (C) may additionally comprise at least one polyamide (B) different from polyamide (A). If present, said polyamide (B) is comprised in the composition (C) in an amount inferior to the amount of polyamide (A), that is to say that polyamide (A) is major polyamide component of composition (C).

Said polyamide (B) generally consists essentially of one or more than one recurring units ($R_{PA}$), as above defined.

Exemplary embodiments of polyamides (B) are notably polyamide 6, polyamide 6,6, polyamide 4,6, polyamide 12, polyamide 11.

When the composition (C) includes said polyamide (B), the same is comprised in an amount of at most 30% wt, preferably at most 25% wt, more preferably at most 20% wt, even more preferably at most 10% wt, with respect to the total weight of the composition.

Polyamide (A) and, if present, polyamide (B), are provided in the composition (C) generally under the form of solid particles, generally possessing an average particle size (expressed as median diameter d50) of 5 to 1000 μm, preferably of 20 to 500 μm, more preferably of 50 to 250 μm.

Composition (C) may also comprise at least one opacifying pigment.

Said opacifying pigment is generally selected from the group consisting of of $TiO_2$, $ZnS_2$, $ZnO$, and $BaSO_4$.

The opacifying pigment is advantageously in the form of particles having a weight-average size (equivalent diameter) preferably of below 5 μm. Larger sizes may deleteriously affect the properties of the composition. Preferably, the weight-average size of the particles is of below 1 μm. Besides, it is preferably above 0.1 μm.

The shape of the particles of the opacifying pigment is not particularly limited; they may be notably round, flaky, flat, and so on.

The opacifying pigment is preferably titanium dioxide ($TiO_2$). The form of titanium dioxide is not particularly limited and a variety of crystalline forms such as the anatase form, the rutile form, and the monoclinic type can be used. However, the rutile form is preferred due to its higher refraction index and its superior light stability. Titanium dioxide may or may not be treated with a surface treatment agent. Preferably the average particle size of the titanium oxide is in the range of 0.15 μm to 0.35 μm.

The surface of the titanium dioxide particles will preferably be coated. The titanium dioxide will preferably be first coated with an inorganic coating and then an organic coating that is applied over the inorganic coating. The titanium dioxide particles may be coated using any method known in the art. Preferred inorganic coatings include metal oxides. Organic coatings may include one or more of carboxylic acids, polyols, alkanolamines, and/or silicon compounds.

If present, the opacifying pigment is preferably present in the composition (C) in an amount of at least 0.1 wt. %, preferably of at least 0.3 wt. %, more preferably of at least 0.5 wt. %, even more preferably of at least 0.8 wt. %, based on the total weight of the composition (C). Besides, when present, the opacifying pigment is also preferably present in an amount of at most 5 wt. %, preferably of at most 4 wt. %, more preferably of at most 3.5 wt. %, even more preferably of at most 3 wt. %, and most preferably of at most 2.5 wt. %, based on the total weight of the composition (C).

In order to match colour requirements according to the design of the machine to be equipped with the rack of the invention, the composition (C) may additionally comprise coloured pigments (including black pigments) different from opacifying pigment. Selection of coloured pigment(s) and adjustment of relative amount will be effected by one of ordinary skills in the art following routine experiments for colour matching.

Generally, in embodiments wherein colour matching is necessary, the amount of coloured pigment (different from opacifying pigment) will be of advantageously at least 0.1% wt, preferably at least 0.2% wt, more preferably at least 0.5% wt and advantageously at most 5% wt, preferably 3% wt, more preferably 2.5% wt, with respect to the total weight of the composition (C).

The composition (C) may comprise at least one stabilizer selected from the group consisting of hindered amine compounds, hindered phenol compounds, phosphorous compounds and Copper-containing stabilizers.

The expression "hindered amine compound" is used according to its customary meaning in this field and generally intended to denote derivatives of 2,2,6,6-tetramethyl piperidine well known in the art (see for example: *Plastics Additives Handbook*, 5th ed., Hanser, 2001). The hindered amine compound of the composition according to the present invention may either be of low or high molecular weight.

The hindered amine compounds of low molecular weight have typically a molecular weight of at most 900, preferably at most 800, more preferably of at most 700, still more preferably at most 600 and most preferably of at most 500 g/mol.

Examples of low molecular weight hindered amine compounds are listed in Table 1 below:

TABLE 1

| Formula |
|---|
| (a1) |

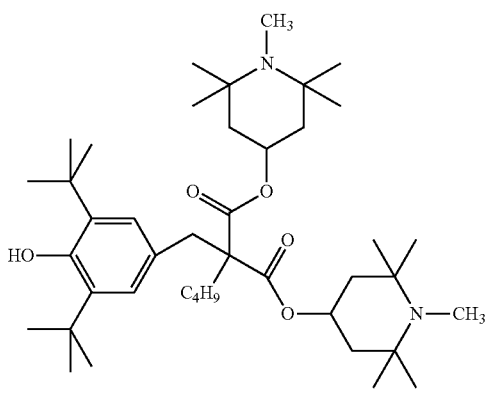

TABLE 1-continued
| Formula |
|---|
| (a2) 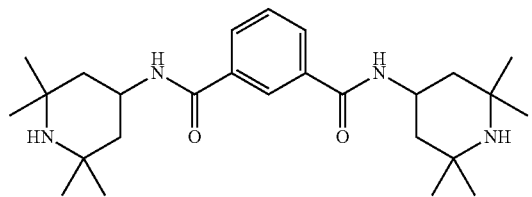 |
| (a3) 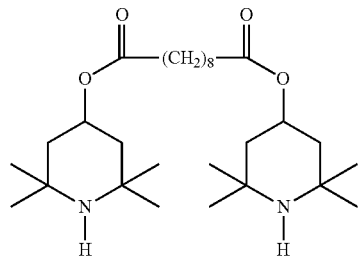 |
| (a4) 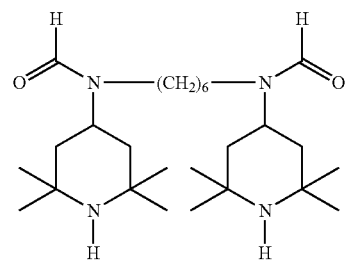 |
| (a5) 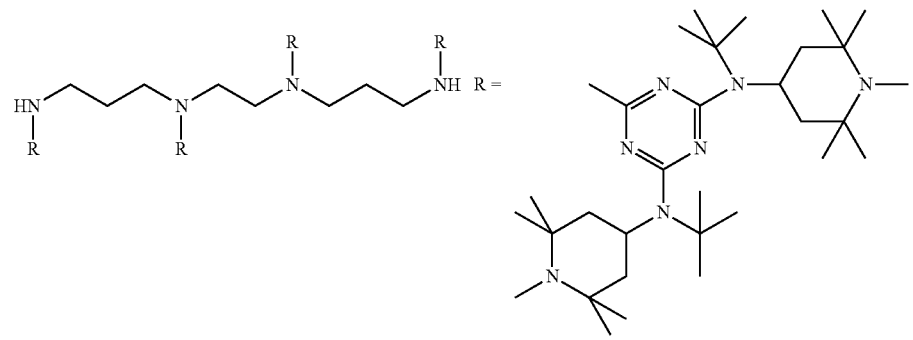 |
| (a6) 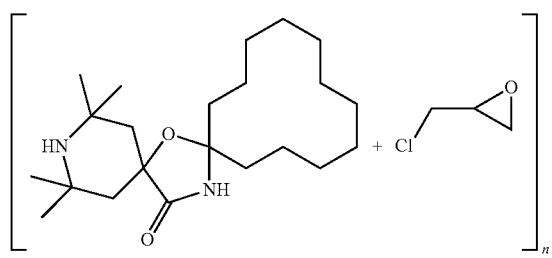 |

TABLE 1-continued
| Formula |
|---|
| (a7) 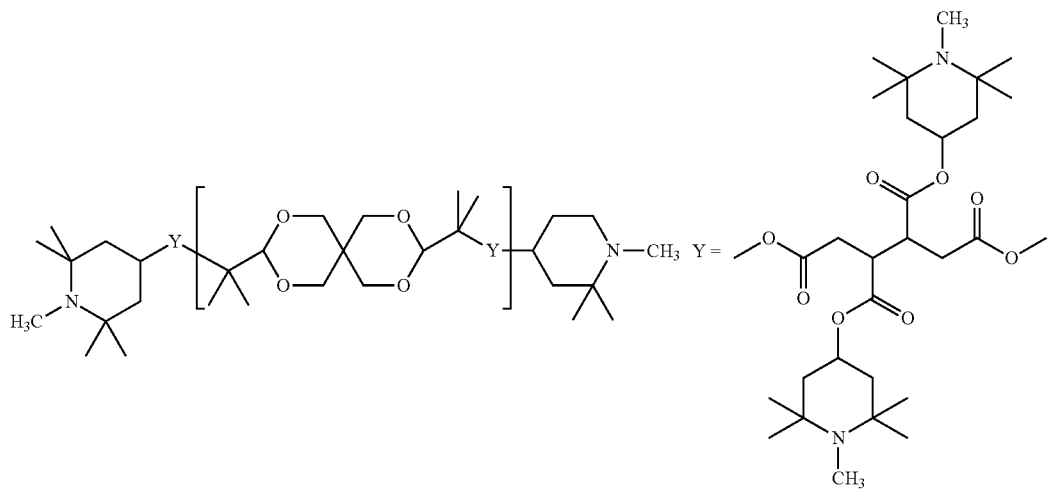 |
| (a8) 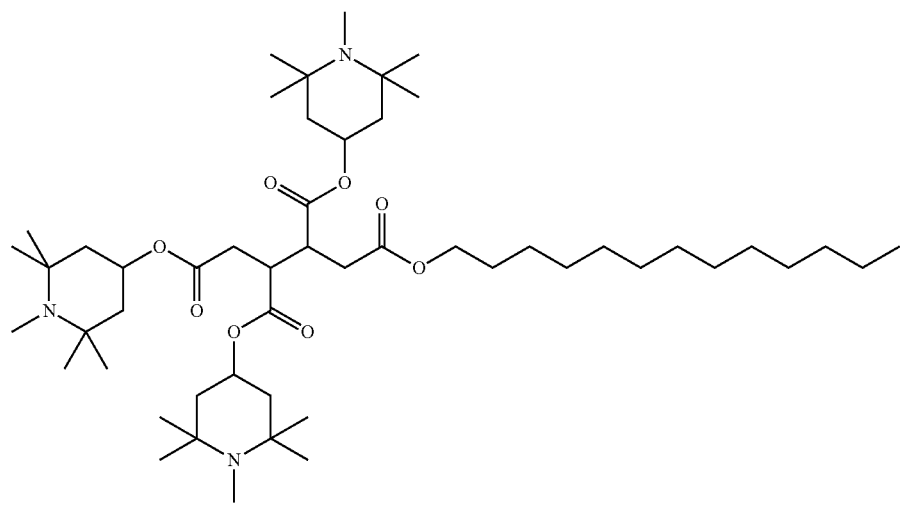 [SMILES: CCCCCCCCCCCCCOC(=O)CC(C(=O)OC1CC(C)(C)N(C)C(C)(C)C1)C(CC(=O)OC1CC(C)(C)N(C)C(C)(C)C1)C(=O)OC1CC(C)(C)N(C)C(C)(C)C1] |
| (a9) 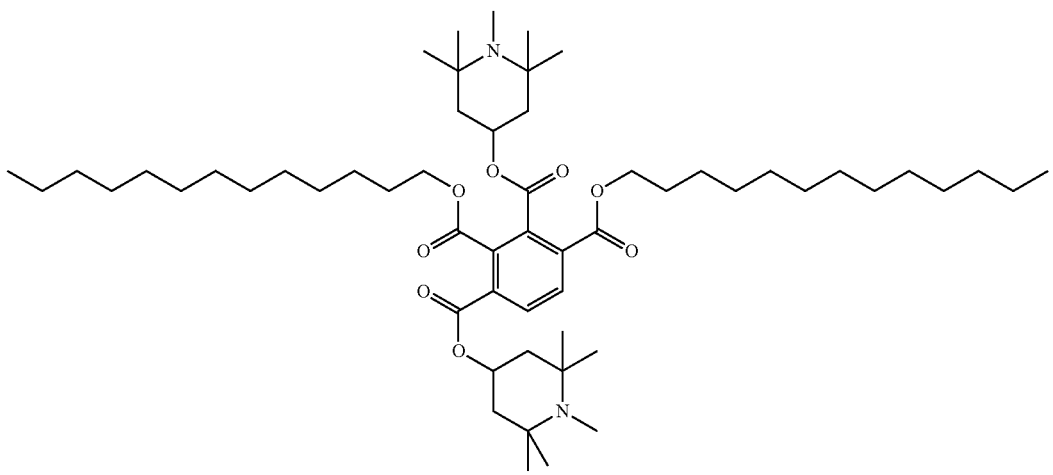 [SMILES: CCCCCCCCCCCCCOC(=O)c1ccc(C(=O)OC2CC(C)(C)N(C)C(C)(C)C2)c(C(=O)OCCCCCCCCCCCCC)c1C(=O)OC1CC(C)(C)N(C)C(C)(C)C1] |

TABLE 1-continued

| Formula | |
|---|---|
| (a10) | *(structure: pentaerythritol-like core with four ester linkages to 2,2,6,6-tetramethylpiperidin-4-yl groups)* |
| (a11) | H—N⟨piperidine, 2,2,6,6-tetramethyl⟩—O—C(=O)—R   R = $C_{16}$-$C_{18}$ |
| (a12) | *(structure: spiro compound combining tetramethylpiperidine with oxazolone and cyclododecane ring)* |

Among those low molecular weight compounds, the hindered amine is preferably selected from the group consisting of the ones corresponding to formula (a1), (a2), (a11) and (a12). More preferably, the hindered amine is selected from the group consisting of the ones corresponding to formula (a1), (a2), and (a12). Still more preferably, the hindered amine is the one corresponding to formula (a2).

The hindered amine compounds of high molecular weight are typically polymeric and have typically a molecular weight of at least 1000, preferably at least 1100, more preferably of at least 1200, still more preferably at least 1300 and most preferably of at least 1400 g/mol.

Examples of high molecular weight hindered amine compounds are listed in Table 2 below:

TABLE 2

| Formula | |
|---|---|
| (b1) | *(structure: 2,2,6,6-tetramethylpiperidin-4-yl-oxy-propyl group attached to polysiloxane: —[Si(R)(—O—)]$_n$—)* |

TABLE 2-continued
| Formula |
|---|
| (b2) 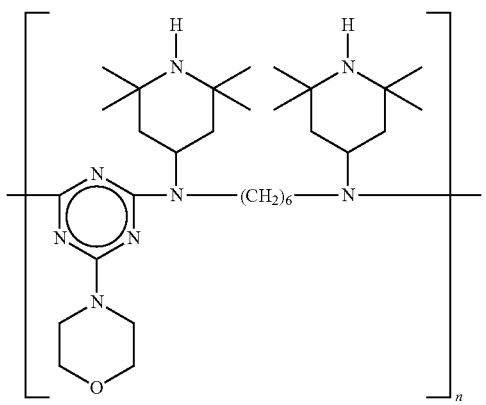 |
| (b3) 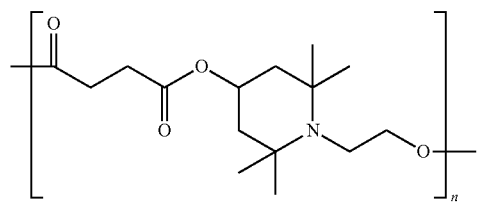 |
| (b4) 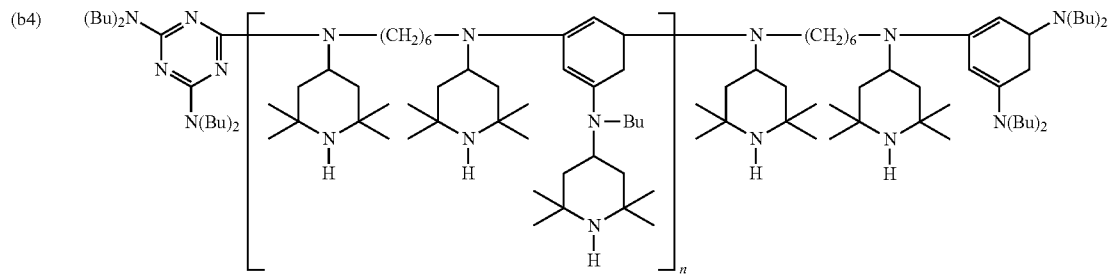 |
| (b5) 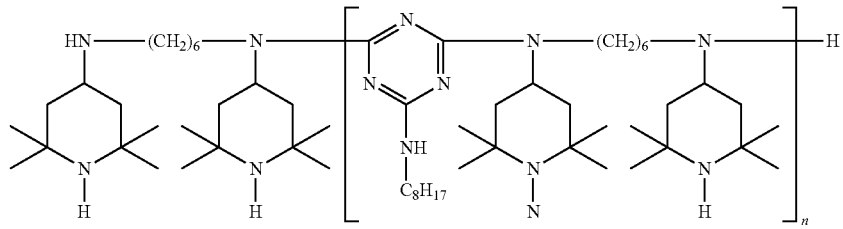 |
| (b6) 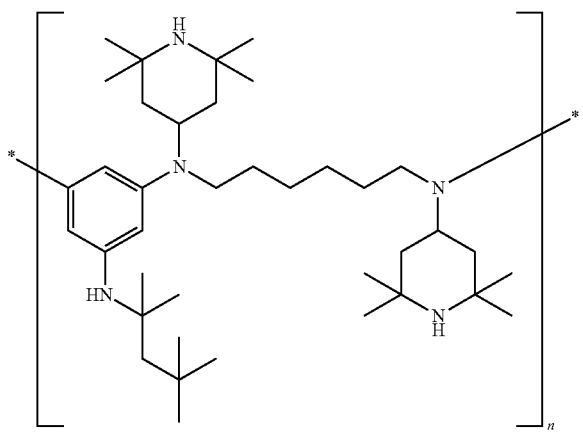 |

The "n" in the formulas (b1) to (b6) of Table 2 indicates the number of repeating units in the polymer and is usually an integral equal or greater than 4.

Among those high molecular weight compounds, the hindered amine is preferably selected from the group consisting of the ones corresponding to formula (b2) and (b5). More preferably, the high molecular weight hindered amine is the one corresponding to formula (b2).

If used, the hindered amine compound is typically present in an amount of advantageously at least 0.01 wt. %, more preferably at least 0.05 wt. %, still more preferably at least 0.1 wt. %, based on the total weight of the composition.

Similarly, when present, the hindered amine compound is also typically present in an amount of advantageously at most 3.5 wt. %, preferably at most 3 wt. %, more preferably at most 2.5 wt. %, still more preferably at most 2.0 wt. %, even more preferably at most 0.8 wt. % and most preferably at most 0.6 wt. %, based on the total weight of the composition.

The expression "hindered phenol compound" is used according to its customary meaning in this field and generally intended to denote derivatives of ortho-substituted phenol, especially (but not limited to) di-tert-butyl-phenol derivatives, well known in the art Examples of hindered phenol compounds are listed in Table 3 below:

TABLE 3

(d1) tetrakis(3-(3,5-di-tert-butyl-4-hydroxyphenyl)propionate), commercially available notably as Irganox ® 1010 stabilizer from BASF (d2) Thiodiethylene bis[3-(3,5-di-tert.-butyl-4-hydroxy-phenyl)propionate], commercially available notably as Irganox ® 1035 stabilizer from BASF (d3) Octadecyl-3-(3,5-di-tert.butyl-4-hydroxyphenyl)-propionate, commercially available botable as Irganox ® 1076 stabilizer from BASF (d4) N,N'-hexane-1,6-diylbis(3-(3,5-di-tert.-butyl-4-hydroxyphenylpropionamide)), commercially available notable as Irganox ® 1098 stabilizer from BASF

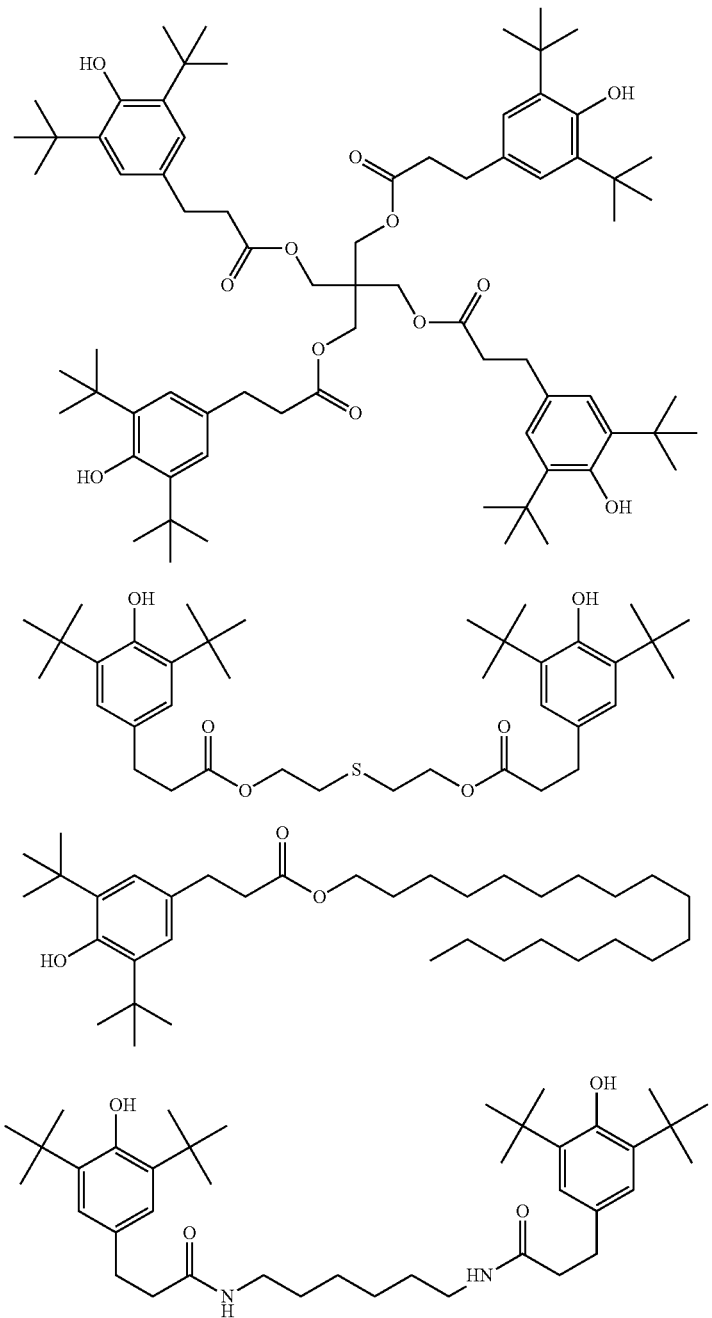

TABLE 3-continued (d5)
1,3,5-Trimethyl-2,4,6-tris(3,5-di-tert-butyl-4-hydroxybenzyl)benzene, commercially available notably as Irganox ® 1330 stabilizer from BASF

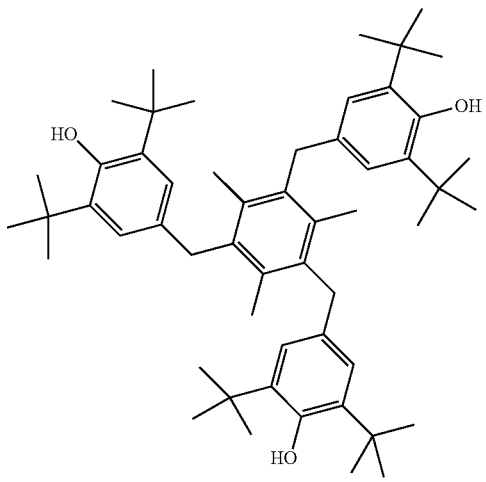 [SMILES: Cc1c(Cc2cc(C(C)(C)C)c(O)c(C(C)(C)C)c2)c(C)c(Cc2cc(C(C)(C)C)c(O)c(C(C)(C)C)c2)c(C)c1Cc1cc(C(C)(C)C)c(O)c(C(C)(C)C)c1]

(d6)
Benzenepropanoic acid, 3,5-bis(1,1-dimethylethyl)-4-hydroxy-,C7-C9 branched alkyl esters, commercially available notably as Irganox ® 1135 stabilizer from BASF

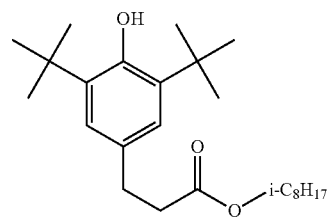

(d7)
Hexamethylene bis[3-(3,5-di-tert-butyl-4-hydroxyphenyl)propionate], commercially available notably as Irganox ® 259 stabilizer from BASF

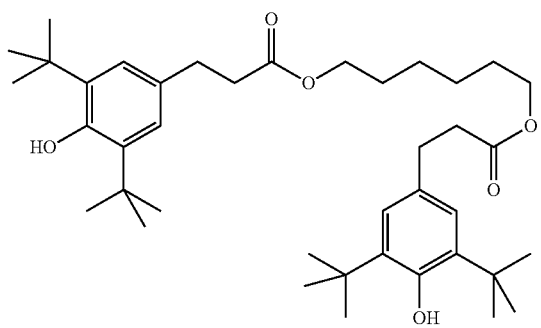 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]

(d8)
Tris(3,5-di-tert-butyl-4-hydroxybenzyl) isocyanurate, commercially available notably as Irganox ® 3114 stabilizer from BASF

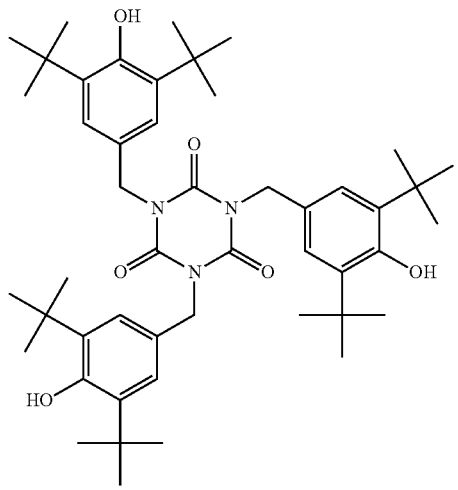 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE 3-continued

| | |
|---|---|
| (d9) 2,6-di-tert-butyl-4-(4,6-bis(octylthio)-1,3,5-triazin-2-ylamino)phenol, commercially available notably as Irganox ® 565 stabilizer from BASF | 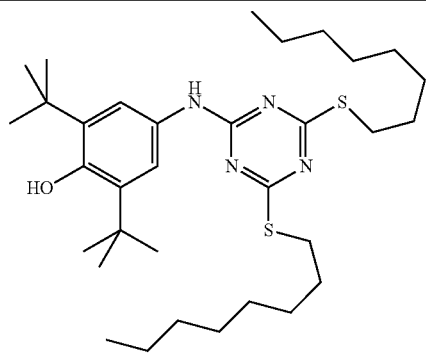 |
| (d10) commercially available notably as Irganox ® 1425 stabilizer from BASF | 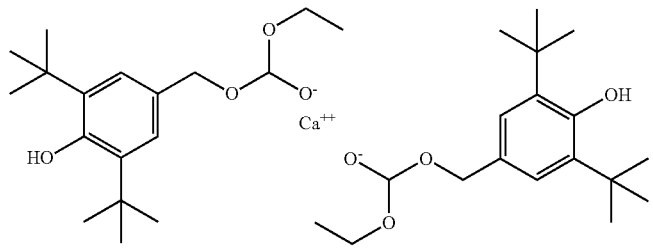 [SMILES: CCOC([O-])OCc1cc(C(C)(C)C)c(O)c(C(C)(C)C)c1 ; [Ca+2] ; CCOC([O-])OCc1cc(C(C)(C)C)c(O)c(C(C)(C)C)c1] |
| (d11) 2-Methyl-4,6-bis(octylsulfanylmethyl)phenol, commercially available notanly as Irganox ® 1520 stabilizer from BASF | 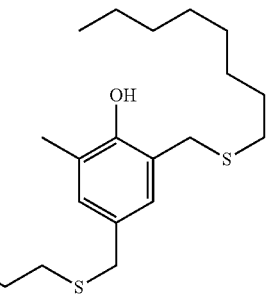 |
| (d12) 2,4-Bis(dodecylthiomethyl)-6-methylphenol, commercially available notably as Irganox ® 1726 stabilizer from BASF | 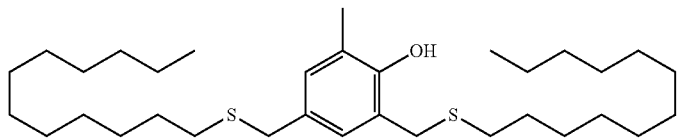 [SMILES: CCCCCCCCCCCCSCc1cc(C)c(O)c(CSCCCCCCCCCCCC)c1] |
| (d13) Tirethylene glycol bis(3-tert-butyl-4-hydroxy-5-methylphenyl)propionate, commercially available as Irganox ® 245 stabilizer from BASF | 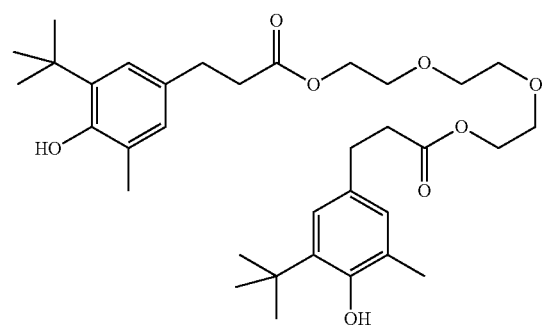 [SMILES: Cc1cc(CCC(=O)OCCOCCOCCOC(=O)CCc2cc(C)c(O)c(C(C)(C)C)c2)cc(C(C)(C)C)c1O] |

A hindered phenol compound which has been found particularly effective in the composition (C) of the dish support rack of the invention is N,N'-hexane-1,6-diylbis(3-(3,5-di-tert-butyl-4-hydroxyphenylpropionamide)) of formula (d4), as above specified.

If used, the hindered phenol compound is typically present in an amount of advantageously at least 0.01 wt. %, more preferably at least 0.05 wt. %, still more preferably at least 0.1 wt. %, based on the total weight of the composition.

Similarly, when present, the hindered phenol compound is also typically present in an amount of advantageously at most 3.5 wt. %, preferably at most 3 wt. %, more preferably at most 2.5 wt. %, still more preferably at most 2.0 wt. %, even more preferably at most 0.8 wt. % and most preferably at most 0.6 wt. %, based on the total weight of the composition.

The composition (C) may comprise at least one phosphorous compound selected from the group consisting of an alkali or alkali earth metal hypophosphites, phosphite esters, phosphonites and mixtures thereof.

Sodium and calcium hypophosphites are preferred alkali or alkali earth metal hypophosphites.

A phosphite ester may be represented by the formula $P(OR)_3$, while a phosphonite may be represented by the formula $P(OR)_2R$, wherein each of R, can be the same or different and are typically independently selected from the group consisting of a $C_{1-20}$ alkyl, $C_{3-22}$ alkenyl, $C_{6-40}$ cycloalkyl, $C_{7-40}$ cycloalkylene, aryl, alkaryl or arylalkyl moiety.

Examples of phosphite esters are listed in the Table 4 below:

TABLE 4

| Formula | |
|---|---|
| (e1) | *structure* |
| (e2) | *structure* |
| (e3) | *structure* |
| (e4) | *structure* |
| (e5) | *structure* |
| (e6) | *structure* |

TABLE 4-continued
Formula
(e7)
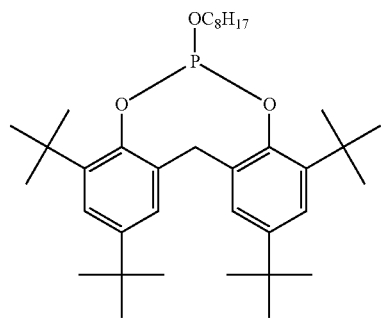
(e8)
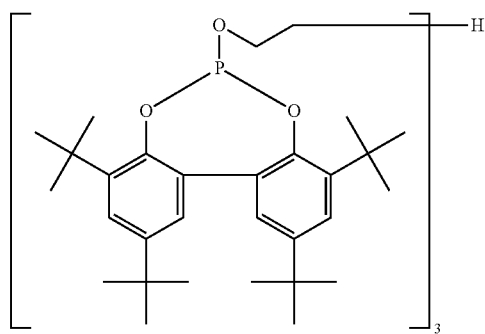
(e9)
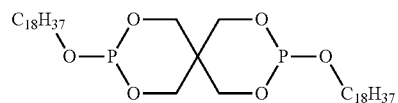
(e10)
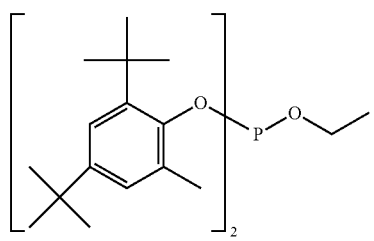
(e11)
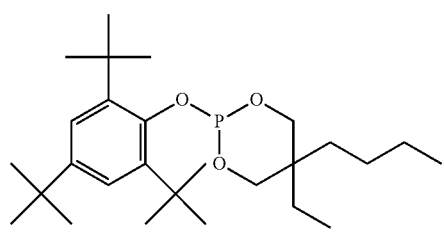 [SMILES: CCCCC1(CC)COP(Oc2c(C(C)(C)C)cc(C(C)(C)C)cc2C(C)(C)C)OC1]

TABLE 4-continued

| Formula | |
|---|---|
| (e12) | 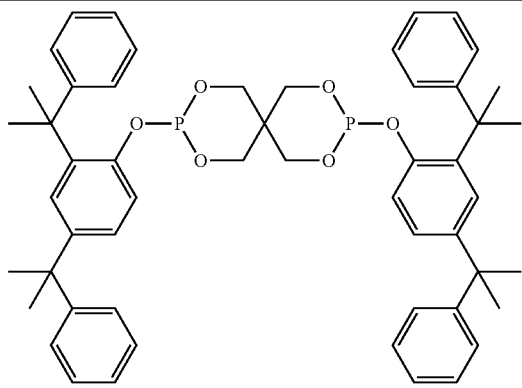 |

Examples of phosphonites are listed in the table 5 below:

TABLE 7

| Formula | Structure |
|---|---|
| (f1) | 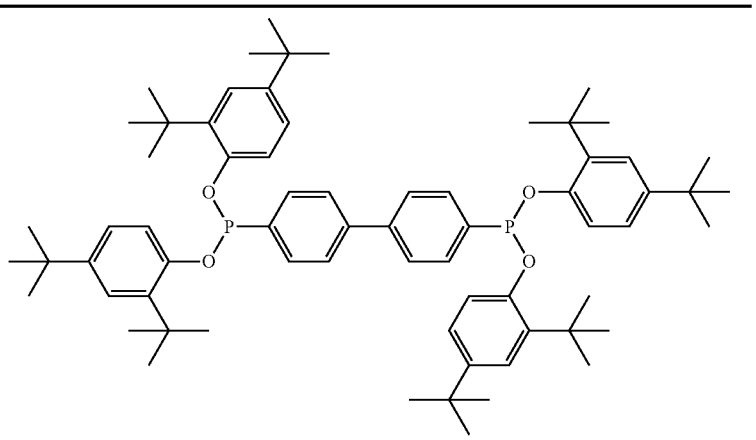 |
| (f2) | 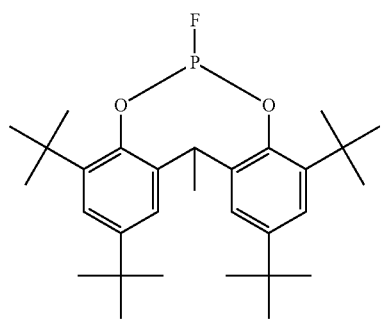 [SMILES: CC1c2cc(C(C)(C)C)cc(C(C)(C)C)c2OP(F)Oc2c1cc(C(C)(C)C)cc2C(C)(C)C] |

When used in the composition (C), the phosphorous compound is preferably present in an amount of at least 0.01 wt. %, more preferably at least 0.05 wt. %, based on the total weight of the composition.

The phosphorous compound is also preferably present in an amount of at most 1 wt. %, more preferably at most 0.5 wt. %, still more preferably at most 0.25 wt. %, based on the total weight of the composition.

Copper-containing stabilizers useful in the practice of the invention may be characterized as comprising a copper compound and an alkali metal halide. More particularly, the copper-containing stabilizer will consist essentially of a copper compound [compound (Cu)] selected from the group consisting of copper (I) oxide, copper (II) oxide, copper (I) salt, for example cuprous acetate, cuprous stearate, a cuprous organic complex compound such as copper acetylacetonate, a cuprous halide or the like; and an alkali metal halide [halide (M)]. Preferably, the copper-containing stabilizer will consist essentially of a copper halide selected from copper iodide and copper bromide and the alkali metal halide will preferably be selected from the iodides and bromides of lithium, sodium and potassium.

A particularly preferred combination is the combination of CuI and KI.

The copper-containing stabilizer will preferably comprise a copper (I) compound [compound (Cu)] and an alkali metal halide [halide (M)] at a weight ratio compound (Cu):halide (M) of 1:99 to 30:70, preferably 5:95 to 20:80, more preferably 10:90 to 15:85. A weight ratio compound (Cu):halide (M) which has been found particularly effective is of about 0.15 (i.e. corresponding to about 13:87).

When present, the combined weight of compound (Cu) and halide (M), i.e. of the copper-containing stabilizer, in the composition (C) will amount to from about 0.01 to about 3 wt %, preferably from about 0.02 to about 2.5% wt, more preferably from about 0.1 to about 1.5 wt %, based on the total weight of composition (C).

The amount of the compound (Cu) in the copper-containing stabilizer, when incorporated in the composition (C) will generally be sufficient to provide a level of from about 25 to about 1000 ppm, preferably of about 50 to about 500 ppm, more preferably of about 75 to about 150 ppm of Copper in the composition (C).

If needed, the composition (C) may additionally comprise one or more than one reinforcing filler.

Reinforcing fillers are well known by the skilled in the art. The reinforcing filler is preferably selected from fibrous and particulate fillers. More preferably, the reinforcing filler is selected from mineral fillers (such as talc, mica, kaolin, calcium carbonate, calcium silicate, magnesium carbonate), glass fiber, carbon fibers, synthetic polymeric fiber, aramid fiber, aluminum fiber, titanium fiber, magnesium fiber, boron carbide fibers, rock wool fiber, steel fiber, wollastonite etc. Still more preferably, it is selected from mica, kaolin, calcium silicate, magnesium carbonate, glass fiber and wollastonite etc.

A particular class of fibrous fillers consists of whiskers, i.e. single crystal fibers made from various raw materials, such as $Al_2O_3$, SiC, BC, Fe and Ni. Among fibrous fillers, glass fibers are preferred; they include chopped strand A-, E-, C-, D-, S- and R-glass fibers, as described in chapter 5.2.3, p. 43-48 of Additives for Plastics Handbook, 2nd edition, John Murphy, the whole content of which is herein incorporated by reference. Preferably, the filler is chosen from fibrous fillers.

When reinforcement is required, the weight percent of the reinforcing filler in the total weight of the composition (C) is generally of at least 0.5 wt. %, preferably of at least 1 wt. %, more preferably of at least 2 wt. %. Besides, the weight percent of the reinforcing filler in the total weight of the composition (C) is generally of at most 10 wt. %, preferably of at most 5 wt. % and most preferably of at most 3 wt. %.

A composition (C) which has been found particularly suitable in the dish support rack of the invention is a composition consisting essentially of:
a polyamide PA6,10, as above detailed;
from 0.1 to 5% wt of an opacifying pigment, as above detailed;
from 0.01 to 3.5% wt of a hindered phenol compound, as above detailed;
from 0.1 to 5% wt of a coloured pigment different from the opacifying pigment, as above detailed.

The dish support rack of the invention generally includes front, rear and opposing side walls interconnected with a bottom portion, and further includes a plurality of tine members to establish dish support zones in the rack, all formed from a plurality of metal wire element coated with composition (C), as above detailed.

The invention further pertains to a method for manufacturing the dish support rack, as above detailed.

This method generally includes providing a metal wire frame and applying thereupon a coating of composition (C).

Techniques for applying such coating are not particularly limited and are well established in the art.

Generally, composition (C) is provided under the form of powder and introduced in a coating chamber wherein is maintained by appropriate fluxing of inert gas (generally air) in fluidized state. The metal wire frame is heated at a temperature exceeding melting point of the polyamide (A) and introduced in said coating chamber. After appropriate residence time, sufficient for achieving target coating thickness, the metal wire frame is removed from the coating chamber and possibly baked in an oven until formation of a uniform coating of composition (C), so as to obtain the dish support rack of the invention.

Should the disclosure of any patents, patent applications, and publications which are incorporated herein by reference conflict with the description of the present application to the extent that it may render a term unclear, the present description shall take precedence.

The invention claimed is:

1. A dish support rack, comprising:
a metal wire frame coated with a polyamide composition, said composition comprising:
more than 50 weight % of a polyamide, that comprises recurring units, wherein more than 50 mole % of the recurring units are first recurring units according to the formula: —HN—$(CH_2)_6$—NH—C(O)—$(CH_2)_8$—C(O)—, and said polyamide exhibits a relative viscosity of at least 2.5 and of at most 4.2, when measured in formic acid, according to ISO 307 standard.

2. The dish support rack of claim 1, wherein the polyamide is a co-polyamide, wherein the recurring units, further comprise second recurring units according to formula (I) or (II), provided that the second recurring units are different from the first recurring units:

—NH—$R^1$—CO— (I),

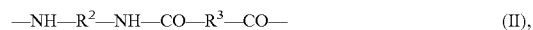
—NH—$R^2$—NH—CO—$R^3$—CO— (II), wherein:
$R^1$, equal to or different from each other at each occurrence, is a divalent hydrocarbon group having from 3 to 17 carbon atoms;
$R^2$, equal to or different from each other at each occurrence, is a divalent hydrocarbon group having from 2 to 18 carbon atoms; and
$R^3$, equal to or different from each other at each occurrence, is a bond or a divalent hydrocarbon group having from 1 to 16 carbon atoms.

3. The dish support rack of claim 2, wherein the polyamide is an aliphatic polyamide.

4. The dish support rack of claim 2, wherein the second recurring units are selected from the group consisting of:

—NH$(CH_2)_5$—CO—, (j)

—NH—$(CH_2)_8$—CO—, (jj)

—NH—$(CH_2)_9$—CO—, (jjj)

—NH—$(CH_2)_{10}$—CO—, (jv)

—NH—$(CH_2)_{11}$—CO—, (v)

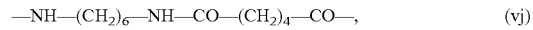
—NH—$(CH_2)_6$—NH—CO—$(CH_2)_4$—CO—, (vj)

—NH—(CH$_2$)$_6$—NH—CO—(CH$_2$)$_{10}$—CO—,  (vjj)

—NH—(CH$_2$)$_6$—NH—CO—(CH$_2$)$_{12}$—CO—,  (vjjj)

—NH—(CH$_2$)$_{10}$—NH—CO—(CH$_2$)$_{10}$—CO—  (jx)

—NH—(CH$_2$)$_6$—NH—CO—(CH$_2$)$_7$—CO—,  (x)

—NH—(CH$_2$)$_{12}$—NH—CO—(CH$_2$)$_{10}$—CO—,  (xj)

—NH—(CH$_2$)$_{10}$—NH—CO—(CH$_2$)$_8$—CO—,  (xjj)

—NH—(CH$_2$)$_4$—NH—CO—(CH$_2$)$_4$—CO—, and  (xjjj)

—NH—(CH$_2$)$_4$—NH—CO—(CH$_2$)$_8$—CO—.  (xjv)

5. The dish support rack of claim 1, wherein more than 60 mole % of recurring units of the polyamide are first recurring units.

6. The dish support rack of claim 5, wherein all recurring units of the polyamide are first recurring units.

7. The dish support rack of claim 1, wherein the composition comprises said polyamide in an amount of at least 60 weight % based on the total weight of the composition.

8. The dish support rack of claim 7, wherein the composition comprises, based on the total weight of the composition, at least 90 weight % of the polyamide.

9. The dish support rack of claim 1, wherein the composition further comprises a second polyamide that is different from said polyamide.

10. The dish support rack of claim 1, wherein said composition further comprises at least one opacifying pigment.

11. The dish support rack of claim 10, wherein the opacifying pigment is present in an amount of at least 0.1 weight % and at most 5 weight % each based on the total weight of the composition.

12. The dish support rack of claim 11, wherein the composition comprises, based on the total weight of the composition, at least 0.3 weight % and at most 4 weight % of the at least one opacifying pigment.

13. The dish support rack of claim 11, wherein the composition comprises, based on the total weight of the composition, at least 0.8 weight % and at most 2.5 weight % of the at least one opacifying pigment.

14. The dish support rack of claim 10, wherein said composition further comprises coloured pigment(s) different from the opacifying pigment.

15. The dish support rack of claim 10, wherein the at least one opacifying pigment-is selected from the group consisting of TiO$_2$, ZnS$_2$, ZnO, and BaSO$_4$.

16. The dish support rack of claim 1, wherein said composition comprises at least one stabilizer selected from the group consisting of hindered amine compounds, hindered phenol compounds, phosphorous compounds, and copper-containing stabilizers.

17. The dish support rack of claim 1, wherein the composition consists essentially of:
the polyamide, wherein the polyamide is PA 6,10;
from 0.1 to 5 weight % of an opacifying pigment;
from 0.01 to 3.5 weight % of a hindered phenol compound;
from 0.1 to 5 weight % of a coloured pigment different from the opacifying pigment;
wherein each weight % is based on the total weight of the composition.

18. A method for manufacturing the dish support rack according to claim 1, comprising applying a coating of the composition to a metal wire frame.

19. The method of claim 18, wherein the step of coating comprises:
maintaining the composition, in the form of powder, in a coating chamber in fluidized state, and
introducing the metal wire frame, heated at a temperature exceeding melting point of the polyamide, in said coating chamber; and
removing, after a residence time in said coating chamber sufficient for achieving target coating thickness, the coated metal wire frame from the coating chamber.

20. The dish support rack of claim 1, wherein the polyamide is a homo-polyaniide PA6.10.

* * * * *